(12) United States Patent
Xu

(10) Patent No.: US 12,211,270 B2
(45) Date of Patent: Jan. 28, 2025

(54) VIDEO ANNOTATING METHOD, CLIENT, SERVER, AND SYSTEM

(71) Applicant: SHANGHAI BILIBILI TECHNOLOGY CO., LTD., Shanghai (CN)

(72) Inventor: Xingwang Xu, Shanghai (CN)

(73) Assignee: SHANGHAI BILIBILI TECHNOLOGY CO., LTD., Shanghai (CN)

(*) Notice: Subject to any disclaimer, the term of this patent is extended or adjusted under 35 U.S.C. 154(b) by 489 days.

(21) Appl. No.: 17/520,027

(22) Filed: Nov. 5, 2021

(65) Prior Publication Data

US 2022/0147739 A1 May 12, 2022

(30) Foreign Application Priority Data

Nov. 6, 2020 (CN) .......................... 202011232433.1

(51) Int. Cl.
*G06K 9/00* (2022.01)
*G06T 7/73* (2017.01)
(Continued)

(52) U.S. Cl.
CPC .............. *G06V 20/20* (2022.01); *G06T 7/74* (2017.01); *G06V 20/40* (2022.01)

(58) Field of Classification Search
CPC ........................................................ G06T 7/74
See application file for complete search history.

(56) References Cited

U.S. PATENT DOCUMENTS 8,984,406 B2 * 3/2015 Pueyo .................... H04N 21/21
715/230
11,483,366 B2 * 10/2022 Markan ................ G11B 27/102
(Continued)

FOREIGN PATENT DOCUMENTS

CN 101930779 A * 12/2010
CN 103797783 A 5/2014
(Continued)

OTHER PUBLICATIONS

Character-Oriented Video Summarization With Visual and Textual Cues, Peilun Zhou et al., IEEE, Oct. 2020, pp. 2684-2697 (Year: 2020).*

(Continued)

*Primary Examiner* — Jayesh A Patel
(74) *Attorney, Agent, or Firm* — BakerHostetler

(57) ABSTRACT

The present disclosure describes techniques for annotating a video. The techniques comprises receiving an operation of creating a bullet screen of annotating a target object in a first frame; determining a display position of the bullet screen in the first frame; displaying the bullet screen at the display position in the first frame; determining an offset of the display position of the bullet screen relative to a position of the target object in the first frame; and displaying the bullet screen at a target display position in a second frame of the video, wherein the target display position in the second frame is determined based at least in part on the offset of the display position of the bullet screen relative to the position of the target object in the first frame, the second frame is played subsequent to the first frame, and the second frame comprises the target object.

18 Claims, 11 Drawing Sheets

---

In a playing process of a video, receive an operation of creating an annotating bullet screen for a target object in a first video frame — 402

Perform image recognition on the first video frame, to determine the target object in the first video frame corresponding to the operation of creating the annotating bullet screen; determine an object type of the target object; in a case that the object type indicates a to-be-followed object, determine, based on an offset of the annotating bullet screen relative to the target object in the first video frame, a target display position of the annotating bullet screen relative to the target object in the first video frame; in a case that the object type indicates an unfollowed object, determine, based on a display position of the annotating bullet screen in the first video frame, the target display position of the annotating bullet screen is relative to the target object in the first video frame; and display the annotating bullet screen at the target display position in the first video frame — 404

Display the annotating bullet screen at a target display position in a second video frame of the video, where the second video frame is played after the first video frame and includes a video frame of the target object — 406

(51) Int. Cl.
*G06V 20/20* (2022.01)
*G06V 20/40* (2022.01)

(56) References Cited

U.S. PATENT DOCUMENTS

| | | | |
|---|---|---|---|
| 2013/0145269 A1* | 6/2013 | Latulipe | G06F 3/048 715/720 |
| 2015/0074508 A1* | 3/2015 | Vagell | G06F 3/0482 715/230 |
| 2017/0249970 A1* | 8/2017 | Loganathan | G11B 27/327 |
| 2017/0257413 A1* | 9/2017 | Markan | G06F 40/169 |
| 2018/0301170 A1* | 10/2018 | Rezanezhad Gatabi | G11B 27/11 |

FOREIGN PATENT DOCUMENTS

| | | | | |
|---|---|---|---|---|
| CN | 104811816 A | * | 7/2015 | ......... H04N 21/4316 |
| CN | 106296722 A | | 1/2017 | |
| CN | 106529485 A | * | 3/2017 | ......... G06K 9/00751 |
| CN | 106982387 A | | 7/2017 | |
| CN | 108235105 A | * | 6/2018 | ........... H04N 21/235 |
| CN | 108616772 A | * | 10/2018 | ........... H04N 21/431 |
| CN | 110062272 A | | 7/2019 | |
| CN | 111800668 A | | 10/2020 | |
| EP | 3606081 A1 | * | 3/2020 | ............... G09G 5/14 |
| JP | 2008-148071 A | | 6/2008 | |

OTHER PUBLICATIONS

Deducing the Visual Focus of Attention from Head Pose Estimation in Dynamic Multi-View Meeting Scenarios, Michael Voit et al., ACM, 2008, pp. 173-180 (Year: 2008).*

Movie summarization using bullet screen comments, Shan Sun et al., Springer, May 15, 2017, pp. 9093-9110 (Year: 2017).*

* cited by examiner

VIDEO ANNOTATING METHOD, CLIENT, SERVER, AND SYSTEM

The present application claims priority to Chinese Patent Application No. 202011232433.1, titled "VIDEO ANNOTATING METHOD, CLIENT, SERVER, AND SYSTEM", filed on Nov. 6, 2020 with the National Intellectual Property Administration, PRC, which is incorporated herein by reference in its entirety.

BACKGROUND

With the rapid development of computer technologies, various kinds of videos have been developed. In the video playing field, users can comment on a video. In the video displaying field, user comments may bring an experience of real-time interaction among viewers, which may greatly increase an interest and a sense of participation of the viewer when watching a video.

SUMMARY

In view of this, a video annotating method, a video annotating client, a video annotating system, a video annotating server, a computing device, and a computer-readable storage medium are provided according to embodiments of the present disclosure, to eliminate the technical defects in the conventional technology.

According to a first aspect of the embodiments of the present disclosure, a video annotating method is provided. The method includes:
  in a playing process of a video, receiving an operation of creating an annotating bullet screen for a target object in a first video frame;
  determining, based on the operation of creating the annotating bullet screen, a target display position of the annotating bullet screen relative to the target object in the first video frame, and displaying the annotating bullet screen at the target display position in the first video frame; and
  displaying the annotating bullet screen at a target display position in a second video frame of the video, where the second video frame is played after the first video frame and includes the target object.

According to a second aspect of the embodiments of the present disclosure, a video annotating method is provided. The method includes:
  receiving, from a client, a timestamp of a first video frame, an annotating bullet screen, and a target display position of the annotating bullet screen relative to a target object in a first video frame;
  determining a second video frame in a video based on the timestamp of the first video frame, where the second video frame is played after the first video frame and includes the target object;
  determining a target display position of the annotating bullet screen in the second video frame based on the target display position of the annotating bullet screen relative to the target object in the first video frame; and
  transmitting, to the client, a timestamp of the second video frame, the annotating bullet screen, and the target display position in the second video frame.

According to a third aspect of the embodiments of the present disclosure, a video annotating client is provided. The client includes: a first receiving module, a first determining module, and a displaying module. The first receiving module is configured to receive an operation of creating an annotating bullet screen for a target object in a first video frame in a playing process of a video. The first determining module is configured to determine, based on the operation of creating the annotating bullet screen, a target display position of the annotating bullet screen relative to the target object in the first video frame, and display the annotating bullet screen at the target display position in the first video frame. The displaying module is configured to display the annotating bullet screen at a target display position in a second video frame of the video, where the second video frame is played after the first video frame and includes the target object.

According to a fourth aspect of the embodiments of the present disclosure, a video annotating server is provided. The server includes: a second receiving module, a second determining module, a third determining module, and a first transmitting module. The second receiving module is configured to receive, from a client, a timestamp of a first video frame, an annotating bullet screen, and a target display position of the annotating bullet screen relative to a target object in a first video frame. The second determining module is configured to determine a second video frame in a video based on the timestamp of the first video frame, where the second video frame is played after the first video frame and includes the target object. The third determining module is configured to determine a target display position of the annotating bullet screen in the second video frame based on the target display position of the annotating bullet screen relative to the target object in the first video frame. The first transmitting module is configured to transmit, to the client, a timestamp of the second video frame, the annotating bullet screen, and the target display position in the second video frame.

According to a fifth aspect of the embodiments of the present disclosure, a video annotating system is provided. The system includes: a client and a server. The client is configured to: receive an operation of creating an annotating bullet screen for a target object in a first video frame in a playing process of a video; determine, based on the operation of creating the annotating bullet screen, a target display position of the annotating bullet screen relative to the target object in the first video frame, and display the annotating bullet screen at the target display position in the first video frame; and transmit, to the server, a timestamp of the first video frame, the annotating bullet screen, and the target display position of the annotating bullet screen relative to the target object in the first video frame. The server is configured to: receive, from the client, the timestamp of the first video frame, the annotating bullet screen, and the target display position of the annotating bullet screen relative to the target object in the first video frame; determine a second video frame in the video based on the timestamp of the first video frame, where the second video frame is played after the first video frame and includes the target object; determine a target display position of the annotating bullet screen in the second video frame based on the target display position of the annotating bullet screen relative to the target object in the first video frame; and transmit, to the client, a timestamp of the second video frame, the annotating bullet screen, and the target display position in the second video frame. The client is further configured to receive, from the server, the timestamp of the second video frame, the annotating bullet screen, and the target display position of the annotating bullet screen in the second video frame; and display the annotating bullet screen at the target display position in the second video frame.

According to a sixth aspect of the embodiments of the present disclosure, a computing device is provided. the computing device includes a memory and a processor. The memory is configured to store computer-executable instructions. The processor is configured to execute the computer-executable instructions to perform steps of the video annotating method according to the first aspect or the second aspect.

According to a seventh aspect of the embodiments of the present disclosure, a computer-readable storage medium is provided, which includes computer-executable instructions stored thereon. The computer instructions, when executed by a processor, perform steps of the video annotating method according to the first aspect or the second aspect.

With the video annotating method according to the present disclosure, in a playing process of a video, an operation of creating an annotating bullet screen for a target object in a first video frame may be received. A target display position of the annotating bullet screen relative to the target object in the first video frame is determined based on the operation of creating the annotating bullet screen, and the annotating bullet screen is displayed at the target display position in the first video frame. The annotating bullet screen is displayed at a target display position in a second video frame of the video, where the second video frame is played after the first video frame and includes the target object. In this case, the user may create an annotating bullet screen for the target object, to annotate the target object, and the annotating bullet screen may be continuously displayed at a position corresponding to the target object in a subsequent video frame. That is, a function to annotate the target object in the video is provided through the annotating bullet screen, and the annotating bullet screen may be displayed in the second video frame by following the target object, such that a viewer can be reminded to pay attention to the target object in a subsequent part of the video, thereby facilitating explanation and prompting to the video content, thus greatly improving the user experience.

DETAILED DESCRIPTION OF EMBODIMENTS

Many specific details are explained in the following description, to fully understand the present disclosure. However, the present disclosure may be implemented in many ways other than those described herein, and those skilled in the art may make similar extensions without violating the connotation of the present disclosure. Therefore, the present disclosure is not limited to embodiments disclosed below.

The terms used in one or more embodiments of the present disclosure are only for the purpose of describing the specific embodiments, and are not intended to limit the one or more embodiments of the present disclosure. The singular forms of "a", "said" and "the" in the one or more embodiments and the claims of the present disclosure are also intended to include plural forms, unless being clearly indicated by other meanings in the context. It should also be understood that the term "and/or" in the one or more embodiments of the present disclosure refers to and includes any or all possible combinations of one or more associated listed items.

It is to be understood that although the terms "first", "second", and the like may be used to describe various kind of information in one or more embodiments of the present disclosure, the information should not be limited to these terms. These terms are only used to distinguish the same kind of information from each other. For example, without departing from the scope of one or more embodiments of the present disclosure, "the first" may also be referred to as "the second", and similarly, "the second" may also be referred to as "the first". Depending on the context, the word "if" used herein may be interpreted as "when" or "in a case that" or "in response to a determination".

In the present disclosure, a video annotating method, a video annotating client, a video annotating server, a video annotating system, a computing device, and a computer-readable storage medium are provided in the present disclosure. Detailed descriptions are given in the following embodiments.

In the video playing field, a bullet screen function is very popular. Bullet screens comprise user comments displayed with a video and move across display screen (e.g., from right to left, left to right, top to bottom, or bottom to top) over the content (e.g., video frames). When watching a video, a user may want to remind a viewer to pay attention to a person, an object, or something that is to be happened at a position in the subsequent part of the video. In the conventional technology, the user may create a bullet screen and use written languages in the bullet screen to describe an object that he wants to focus on. However, with the above method, the user may only use written languages, while he cannot annotate the video in real time to remind of the annotated object. Furthermore, a simple and convenient method is required for the operation or processing of video annotation.

Figure 1:
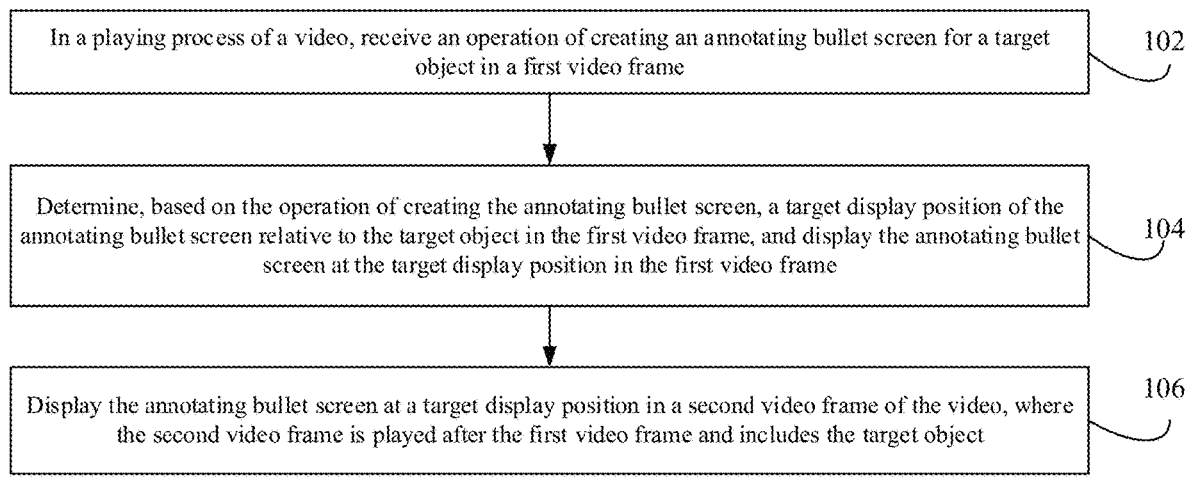
FIG. 1 is a flowchart of a first video annotating method according to an embodiment of the present disclosure.

FIG. 1 is a flowchart of a first video annotating method according to an embodiment of the present disclosure, which is applied to a client. The video annotating method includes the following steps 102 to 106.

In step 102, in a playing process of a video, an operation of creating an annotating bullet screen for a target object in a first video frame is received.

In practice, when viewing a video, a user may want to remind a viewer to pay attention to a person, an object, or something that is to be happened at a position in the subsequent part of the video. Currently, the user may only create a text bullet screen, and use written languages in the text bullet screen to describe an object that he wants to focus on, and it is impossible to annotate a target object in the video in real time.

In order to annotate the target object in the video and make an annotating bullet screen follow the target object, a video annotating method is provided in the present disclosure. In a playing process of a video, an operation of creating an annotating bullet screen for a target object in a first video frame may be received. A target display position of the annotating bullet screen relative to the target object in the first video frame is determined based on the operation of creating the annotating bullet screen, and the annotating bullet screen is displayed at the target display position in the first video frame. The annotating bullet screen is displayed at a target display position in a second video frame of the video, where the second video frame is played after the first video frame and includes the target object. A function to annotate the target object in the video is provided through the annotating bullet screen, and the annotating bullet screen may be displayed in the second video frame by following the target object, such that a viewer can be reminded to pay attention to the target object in a subsequent part of the video, thereby facilitating explanation and prompting to video content.

Specifically, the first video frame represents a current video frame on which the user performs an annotation operation, the target object represents an object that is to be annotated, and the target object may be a person, an object, or a position in the first video frame. In addition, the operation of creating an annotating bullet screen for a target object in a first video frame refers to an operation of circling or selecting the target object in the first video frame by a user on a client.

It is to be noted that, in the playing process of the video, if it is required to annotate the target object, the video may or may not be paused. If there are too many target objects to be annotated and the annotation operation is complicated, the user may pause the video, and then performs annotation. If it is only required to circle a target object or click on the target object, the video may not be paused, as long as a timestamp of the current video frame (that is, the first video frame) can be acquired.

In addition, the bullet screen, as a carrier for displaying content, has a capability to display text, pictures, and display content at a specific position, and the bullet screen, as a basic view, has a capability to detect a touch action and a touch position of a user. Therefore, the touch action and the touch position of the user may be detected through a bullet screen core, and the annotating bullet screen may be displayed around the target object. That is, a bullet screen (that is, an annotating bullet screen) may be created based on an annotation shape drawn by the user for the target object in the video, and the target object in the video may be annotated through the bullet screen. The bullet screen may be played along a time axis, such that the bullet screen can follow the target object in the subsequent part of the video (that is, an annotation shape may be displayed following the target object).

Furthermore, to annotate the target object in the video, an annotation mode should be activated when playing the video. The annotation mode refers to a mode in which a touch track of a user may be received, that is, a mode in which a target object can be annotated.

In an alternative implementation of this embodiment, in a case that the annotation mode is activated, a layer may be created, and the touch track of the user (that is, an annotation operation) may be received through this layer. In this way, the operation of creating the annotating bullet screen for the target object in the first video frame may be received in the following way:

creating an annotation layer in the annotation mode; and
receiving, through the annotation layer, the operation of creating the annotating bullet screen for the target object in the first video frame.

It is to be noted that in a case that the user activates the annotation mode, another layer may be created in a container of the bullet screen for the user to draw. That is, a layer may be additionally created so that the user may draw various shapes on this layer to annotate an object that he wants to annotate. In this way, for the target object, the user may randomly draw an annotation shape according to his preference, such that the target object is annotated flexibly.

Alternatively, without creating a layer, in an annotation mode, image content of the first video frame may be directly recognized, and various objects included in the first video frame is recognized. In this case, each object may be selected, the user may select a target object that he wants to annotate by clicking on the target object, and then a preset annotating bullet screen may be displayed around the target object. For example, in a case that the user clicks on an object A, the operation of creating an annotating bullet screen for a target object in the first video frame is received, if the preset annotating bullet screen is of a circle, the client may display a circled annotating bullet screen at a position corresponding to the object A.

In the present disclosure, in a playing process of the video, the operation of creating an annotating bullet screen for the target object by a user may be received, to create the annotating bullet screen, so as to annotate the target object in the video, thereby facilitating explanation and prompting to the video content, thus greatly improving user experience.

In step 104, based on the operation of creating the annotating bullet screen, a target display position of the annotating bullet screen relative to the target object in the first video frame is determined, and the annotating bullet screen is displayed at the target display position in the first video frame.

Specifically, the annotating bullet screen is a shaped bullet screen, and the annotating bullet screen may be of a regular shape or an irregular shape, and is used to circle the target object for annotation. For example, the annotating bullet screen may be of a circle, a rectangle, or a triangle, or may be of an irregular curve. In addition, after receiving the operation, the client may create an annotating bullet screen (that is, a shaped bullet screen) to annotate the target object. If the operation of creating an annotating bullet screen is an operation of circling the target object, the shape of the annotating bullet screen is a shape drawn by the user on the first video frame. If the operation of creating an annotating bullet screen is an operation of selecting the target object, the shape of the annotating bullet screen is a shape preset by the selection operation. In a specific implementation, when it is required to draw an annotating bullet screen, a bullet screen engine may be used to draw a corresponding shape.

Figure 2:
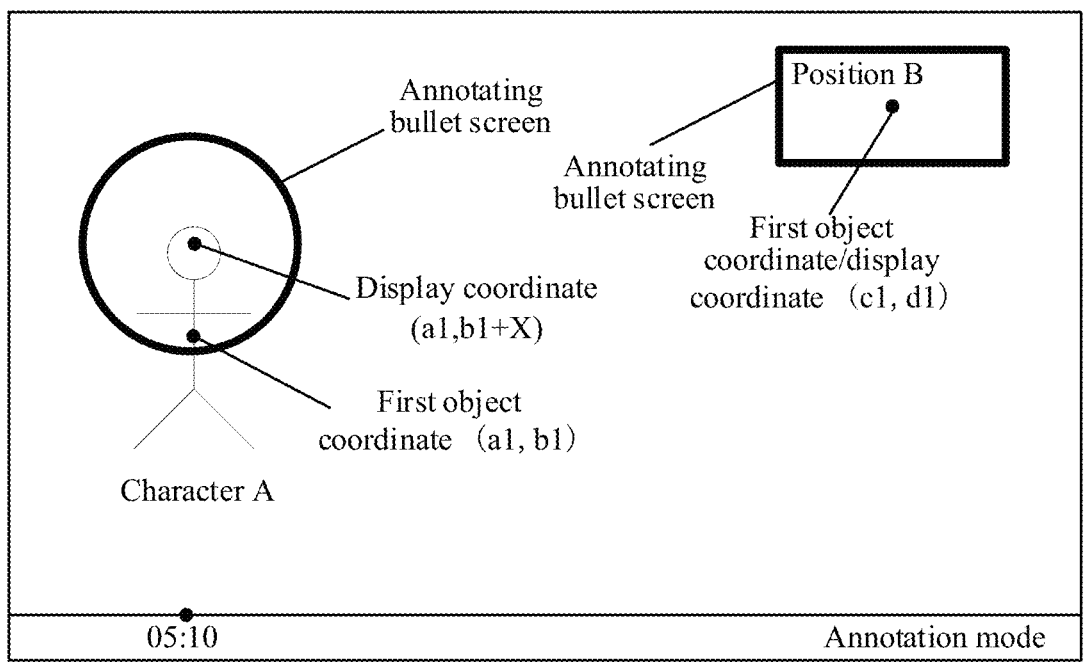
FIG. 2 is a schematic diagram of a process for displaying an annotating bullet screen in a first video frame according to an embodiment of the present disclosure.

For example, FIG. 2 is a schematic diagram of a process for displaying an annotating bullet screen in a first video frame according to an embodiment of the present disclosure. As shown in FIG. 2, in an annotation mode, the video is played to a time of 05:10, the user pauses the video and draws a circle (an annotating bullet screen) on a character A, and draws a rectangle (an annotating bullet screen) at a position B.

It is to be noted that the annotating bullet screen is created for the target object, and the target object may move. When the target object moves, the annotating bullet screen should move with the movement of the target object, that is, the annotating bullet screen should follow the target object. Therefore, it is required to determine, based on the operation of creating an annotating bullet screen, a target display position of the annotating bullet screen relative to the target object in the first video frame, and then display the annotating bullet screen at the target display position in the first video frame. That is, a position of the annotating bullet screen in the first video frame is determined, and then the annotating bullet screen is displayed at this position.

In an alternative implementation of the embodiment, the target display position of the annotating bullet screen relative to the target object in the first video frame is determined in the following way:

performing image recognition on the first video frame, to determine the target object in the first video frame corresponding to the operation of creating the annotating bullet screen;

constructing a coordinate system based on the first video frame, and determine a first object coordinate of the target object in the coordinate system;

determining an offset of the annotating bullet screen relative to the first object coordinate in the coordinate system; and determining the offset of the annotating bullet screen relative to the first object coordinate in the coordinate system as the target display position.

It is to be noted that the operation of creating an annotating bullet screen is performed for the target object, the target object may be determined based on a touch position of the operation of creating an annotating bullet screen. In addition, since the target object may move, the first object coordinate of the target object in the first video frame may be different from a second object coordinate of the target object in a second video frame. Therefore, the target display position of the annotating bullet screen relative to the target object in the first video frame actually represents an offset of the annotating bullet screen relative to the target object. In a case that the second object coordinate of the target object in the second video frame is determined, a target display position in the second video frame may be determined based on the offset.

Specifically, to construct the coordinate system for the first video frame, the center of the first video frame may be used as an origin coordinate, or a vertex of the first video frame may be used as the origin coordinate (for example, a lower left corner is user as the origin coordinate), this is not limited in the present disclosure.

In addition, since the target object generally has an area, that is, the target object corresponds to multiple coordinates (that is, a coordinate range), a coordinate of the center of the target object in the coordinate system may be selected as the first object coordinate of the target object in the coordinate system. In practice, a coordinate of an edge point of the target object in the coordinate system may also be used as the first object coordinate of the target object in the coordinate system, such as a vertex, a lowest point, which is not limited in the present disclosure. Furthermore, the created bullet screen needs to encircle the target object (or partially encircle the target object), that is, the annotating bullet screen is of a shape, and corresponds to multiple coordinates. Therefore, in the present disclosure, an offset of the center of the annotating bullet screen relative to the first object coordinate (the center of the target object) in the coordinate system may be determined. In practice, an offset of an edge point relative to the target object in the coordinate system may be determined, which is not limited in the present disclosure.

Following the above example, as shown in FIG. 2, the user draws a circle on a character A. In this case, the character A is determined as the target object. For the character A, a first object coordinate of the character A (the center) is determined as (a1, b1), if it is determined that the annotating bullet screen is moved up by X relative to (a1, b1) in the coordinate system, the target display position determined in this case is moved up by X relative to an object coordinate of the target object, that is, the display coordinate is determined as (a1, b1+X). The user draws a rectangle at a position B. For the position B, a first object coordinate of the position B (the center) is determined as (c1, d1), if it is determined that an offset of the annotating bullet screen relative to (c1, d1) in the coordinate system is 0, the target display position determined in this case has an offset 0 relative to an object coordinate of the target object, that is, the display coordinate is also determined as (c1, d1).

In the present disclosure, the target display position of the annotating bullet screen relative to the target object in the first video frame may be determined based on the operation of creating an annotating bullet screen, and the annotating bullet screen is displayed at the target display position in the first video frame, to annotate the target object in the first video frame, so as to determine a target display position of the annotating bullet screen in a second video frame, so that the annotating bullet screen may be displayed by following the target object in a subsequent video frame, which facilitates explanation and prompting to the video content.

In step 106, the annotating bullet screen is displayed at a target display position in a second video frame of the video, where the second video frame is played after the first video frame and includes the target object.

Specifically, in a case of creating and displaying the annotating bullet screen in the first video frame, the client may determine a timestamp of the first video frame, determine all video frames in the video that are displayed later than the timestamp based on the timestamp, and then the client performs image recognition on all the video frames that are displayed later than the time stamp, and determines video frames including the target object from all the video frames that are displayed later than the time stamp are determined as second video frames. That is, the client first determines the second video frame in which the annotating bullet screen needs to be displayed from subsequent video frames, and then displays the annotating bullet screen in the second video frame.

In an alternative implementation of this embodiment, the annotating bullet screen is displayed at the target display position in the second video frame of the video in the following way:

performing image recognition on the second video frame, to determine the target object in the second video frame;

determining, in the coordinate system, a second object coordinate of the target object in the second video frame;

determining, based on an offset and the second object coordinate, a display coordinate of the target display position in the coordinate system; and displaying the annotating bullet screen at the display coordinate.

It is to be noted that the target object may move, after acquiring the offset of the annotating bullet screen relative to the target object, image recognition may be performed on the second video frame to determine the second object coordinate of the target object in the second video frame, and then the offset is added to the second object coordinate, to obtain the display coordinate for displaying the annotating bullet screen.

Figure 3:
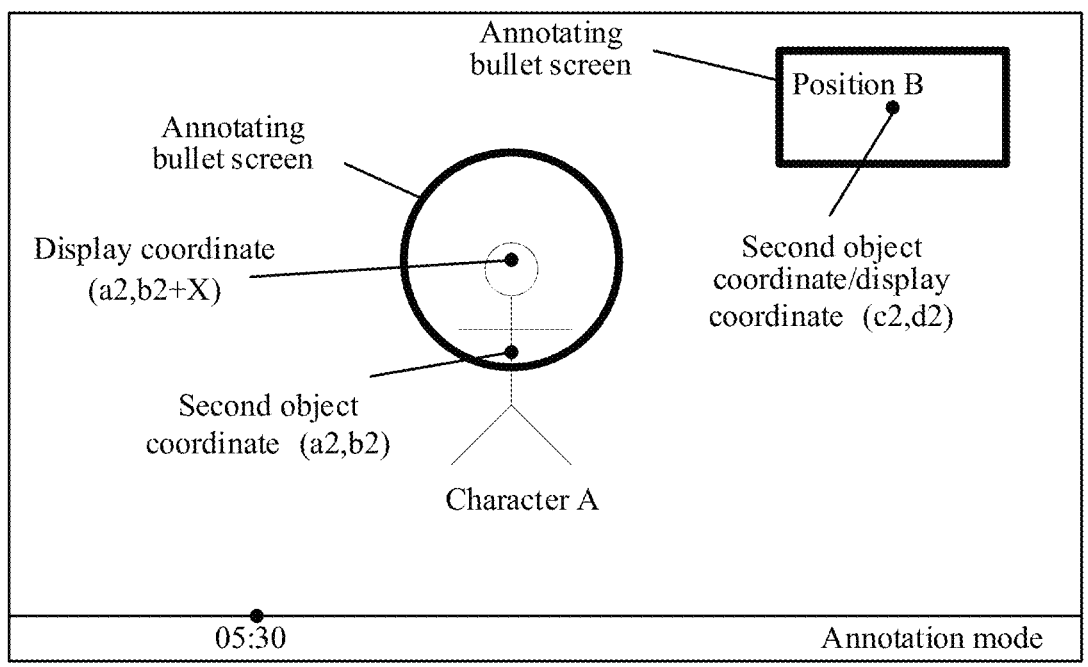
FIG. 3 is a schematic diagram of a process for displaying an annotating bullet screen in a second video frame according to an embodiment of the present disclosure.

Following the above example, FIG. 3 is a schematic diagram of a process for displaying an annotating bullet screen in a second video frame according to an embodiment of the present disclosure. As shown in FIG. 3, for a character A, the second video frame (a video frame at 05:30) is recognized and a second object coordinate of the character A in the second video frame is determined as (a2, b2) in the coordinate system. Since the offset indicates that the annotating bullet screen is moved up by X, that is, an abscissa remains unchanged, and an ordinate adds X. Therefore, the display coordinate of the target display position in the coordinate system for displaying the annotating bullet screen is determined as (a2, b2+X). For the position B, the second video frame is recognized, and the second object coordinate of the position B in the second video frame in the coordinate system is determined as (c2, d2). Since the offset is 0, that is, the abscissa and the ordinate both remain unchanged, the display coordinate of the target display position for displaying the annotating bullet screen is determined as (c2, d2) in the coordinate system.

It is to be noted that the target object may move, that is, the first object coordinate of the target object in the first video frame is different from the second object coordinate of the target object in the second video frame. The target object may also not move, that is, the first object coordinate of the target object in the first video frame is the same as the second object coordinate of the target object in the second video frame. In this embodiment, there is no limitation on whether the target object moves. For any target object, regardless of whether the target object moves, the annotating bullet screen is displayed at a position relative to the target object.

In addition, in some scenarios, the user may only annotate locally and do not want to upload the annotation to a server for multi-terminal synchronization, that is, the user may annotate a video content on his own client. Therefore, in this embodiment, the client performs related processes of creating an annotating bullet screen, determining a target display position and displaying an annotating bullet screen.

Furthermore, for each second video frame in the video, the target display position in the second video frame may be determined. Since different second video frames have different timestamps, and the bullet screen may be capable of displaying with the timestamp, in a case that a target display position in each second video frame is determined, the annotating bullet screen may be displayed at a corresponding target display position in each second video frame along with the time stamp of playing the video.

In the present disclosure, the annotating bullet screen may be displayed at the target display position in the second video frame, so that the display position of the annotating bullet screen may be adjusted in real time based on an actual display position of the target object in the second video frame. That is, the annotating bullet screen may move with the movement of the video content, that is, the annotating bullet screen may be displayed in the second video frame following the target object, so that a viewer may be reminded to pay attention to the target object in the second video frame.

In an alternative implementation of this embodiment, the annotating bullet screen is displayed in the following way:
displaying the annotating bullet screen based on a first display parameter, where the first display parameter is different from a display parameter of a text bullet screen.

Specifically, the display parameter may include color, transparency, and so on. By using different display parameters, it is possible to distinguish between a text bullet screen and an annotating bullet screen, so that the annotating bullet screen and the text bullet screen may be displayed simultaneously without interfering with each other.

With the video annotating method according to the present disclosure, in a playing process of a video, an operation of creating an annotating bullet screen for a target object in a first video frame may be received. A target display position of the annotating bullet screen relative to the target object in the first video frame is determined based on the operation of creating the annotating bullet screen, and the annotating bullet screen is displayed at the target display position in the first video frame. The annotating bullet screen is displayed at a target display position in a second video frame of the video, where the second video frame is played after the first video frame and includes the target object. In this case, the user may create an annotating bullet screen for the target object, to annotate the target object, and the annotating bullet screen may be continuously displayed at a position corresponding to the target object in a subsequent video frame. That is, a function to annotate the target object in the video is provided through the annotating bullet screen, and the annotating bullet screen may be displayed in the second video frame by following the target object, such that a viewer can be reminded to pay attention to the target object in a subsequent part of the video, thereby facilitating explanation and prompting to the video content, thus greatly improving the user experience.

Figure 4:
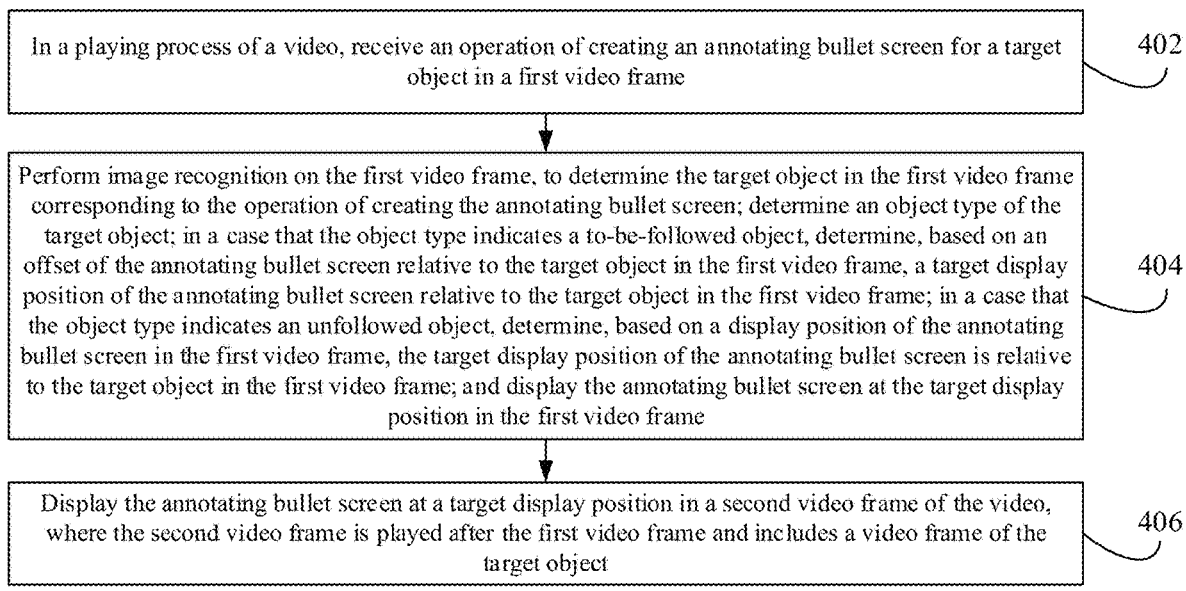
FIG. 4 is a flowchart of a second video annotating method according to an embodiment of the present disclosure.

FIG. 4 is a flowchart of a second video annotating method provided according to an embodiment of the present disclosure, which is applied to a client. The video annotating method includes the following steps 402 to 406.

In step 402, in a playing process of a video, an operation of creating an annotating bullet screen for a target object in a first video frame is received.

It is to be noted that an implementation process of step 402 is the same as the implementation process of step 102 described above, and is not repeated in the present disclosure.

In step 404, image recognition is performed on the first video frame, to determine the target object in the first video frame corresponding to the operation of creating an annotating bullet screen, and an object type of the target object is determined. In a case that the object type indicates a to-be-followed object, a target display position of the annotating bullet screen relative to the target object in the first video frame is determined based on an offset of the annotating bullet screen relative to the target object in the first video frame. In a case that the object type indicates an unfollowed object, the target display position of the annotating bullet screen relative to the target object in the first video frame is determined based on a display position of the annotating bullet screen in the first video frame. The annotating bullet screen is displayed at the target display position of the first video frame.

It is to be noted that the target object may move, when the target object moves, the annotating bullet screen should move with the movement of the target object, that is, the annotating bullet screen needs to follow the target object. The target object may not move, and the display position of the annotating bullet screen in the first video frame is a fixed display position of the annotating bullet screen, that is, the annotating bullet screen is displayed at the fixed display position in each second video frame, that is, positions of both the annotating bullet screen and the target object remain unchanged. That is, if the object type indicates a to-be-followed object, the target display position indicates an offset relative to the target object, and if the object type is an unfollowed object, the target display position is an initial display position of the annotating bullet screen.

Specifically, the object type representing a to-be-followed object means that the target object may move, and the annotating bullet screen needs to follow the target object. The object type representing an unfollowed object means that the target object does not move, and the annotating bullet screen does not need to follow the target object.

In a specific implementation, image recognition may be performed through an artificial intelligence image recognition technology and computer vision (CV), to recognize the target object. In addition, since the moving target object and the non-moving target object have fixed types, in a case that the target object is recognized, it may be determined whether the target object moves, that is, the object type of the target object may be determined. In addition, in order to determine whether the target object moves based on the object type of the target object, a shooting camera needs to be arranged fixedly. That is, in the video content captured by the shooting camera at a fixed position in a fixed posture, the display position of the fixed object is not fixed, and the display position of the moving object changes.

For example, if the target object is recognized as a character, the object type of the target object indicates a to-be-followed object; if the target object is recognized as a fixed position, the object type of the target object indicates an unfollowed object; if the target object is recognized as a dog, the object type of the target object indicates a to-be-followed object; if the target object is recognized as a dog house, the object type of the target object indicates an unfollowed object.

For example, as shown in FIG. 2, the character A is a to-be-followed object, and the position B is an unfollowed object.

In an alternative implementation of the embodiment, the target display position of the annotating bullet screen relative to the target object in the first video frame is determined based on the offset of the annotating bullet screen relative to the target object in the first video frame in the following way:

constructing a coordinate system based on the first video frame, and determine a first object coordinate of the target object in the coordinate system;

determining an offset of the annotating bullet screen relative to the first object coordinate in the coordinate system; and determining the offset of the annotating bullet screen relative to the first object coordinate in the coordinate system as the target display position.

In an alternative implementation of the embodiment, the target display position of the annotating bullet screen relative to the target object in the first video frame is determined based on the display position of the annotating bullet screen in the first video frame in the following way:

constructing a coordinate system based on the first video frame, and determine a bullet screen coordinate of the annotating bullet screen in the coordinate system; and determining the bullet screen coordinate as the target display position.

In the present disclosure, moving target objects and non-moving target objects may be classified, so that the target display position of the target object in the second video frame may be determined in different ways. If the target object is an unfollowed object, this means that the target object is fixed, the target display position of the annotating bullet screen should also be fixed. In this case, the bullet screen coordinate of the annotating bullet screen in the first video frame in the coordinate system is the target display position. In this way, for the non-moving target object, it is unnecessary to follow the target object, and it is unnecessary to perform a complicated recognition and determination process, and the bullet screen coordinate of the annotating bullet screen in the first video frame in the coordinate system is directly determined as the target display position for displaying the annotating bullet screen in a subsequent video frame, thereby reducing performance consumption for recognition.

In step 406, the annotating bullet screen is displayed at a target display position in a second video frame of the video, where the second video frame is played after the first video frame and includes the target object.

It is to be noted that, if the target object is a to-be-followed object, an implementation process of step 406 is similar to the implementation process of step 106 described above, and is not repeated in the present disclosure. If the target object is an unfollowed object, the target display position is the bullet screen coordinate, and the annotating bullet screen is directly displayed at the bullet screen coordinate in the second video frame.

For example, as shown in FIG. 3, the character A is a to-be-followed object, if the target display position of the annotating bullet screen relative to the character A in the first video frame is moved up by X relative to the object coordinate (a1, b1) of the character A, the second video frame is recognized, and an object coordinate of the character A in the second video frame is determined as (a2, b2) in the coordinate system. In this case, a display coordinate of the target display position of the annotating bullet screen in the second video frame is determined as (a2, b2+X) in the coordinate system, that is, the annotating bullet screen is displayed at the display coordinate (a2, b2+X) in the second video frame. The position B is an unfollowed object, if a bullet screen coordinate of the annotating bullet screen for the position B is determined as (c1, d1), the annotating bullet screen is directly displayed at the bullet screen coordinate (c1, d1) in the second video frame.

With the video annotating method in the present disclosure, the user may create an annotating bullet screen for the target object, to annotate the target object, and the annotating bullet screen may be continuously displayed at a position corresponding to the target object in a subsequent video frame. That is, a function to annotate the target object in the video is provided through the annotating bullet screen, and the annotating bullet screen may be displayed in the second video frame by following the target object, such that a viewer can be reminded to pay attention to the target object in a subsequent part of the video, thereby facilitating explanation and prompting to the video content, thus greatly improving the user experience. In addition, moving target objects and non-moving target objects may be classified, for the non-moving target object, it is unnecessary to follow the target object, and it is unnecessary to perform a complicated recognition and determination process, and the bullet screen coordinate of the annotating bullet screen in the first video frame in the coordinate system is directly determined as the target display position for displaying the annotating bullet screen in a subsequent video frame, thereby reducing performance consumption for recognition.

Figure 5:
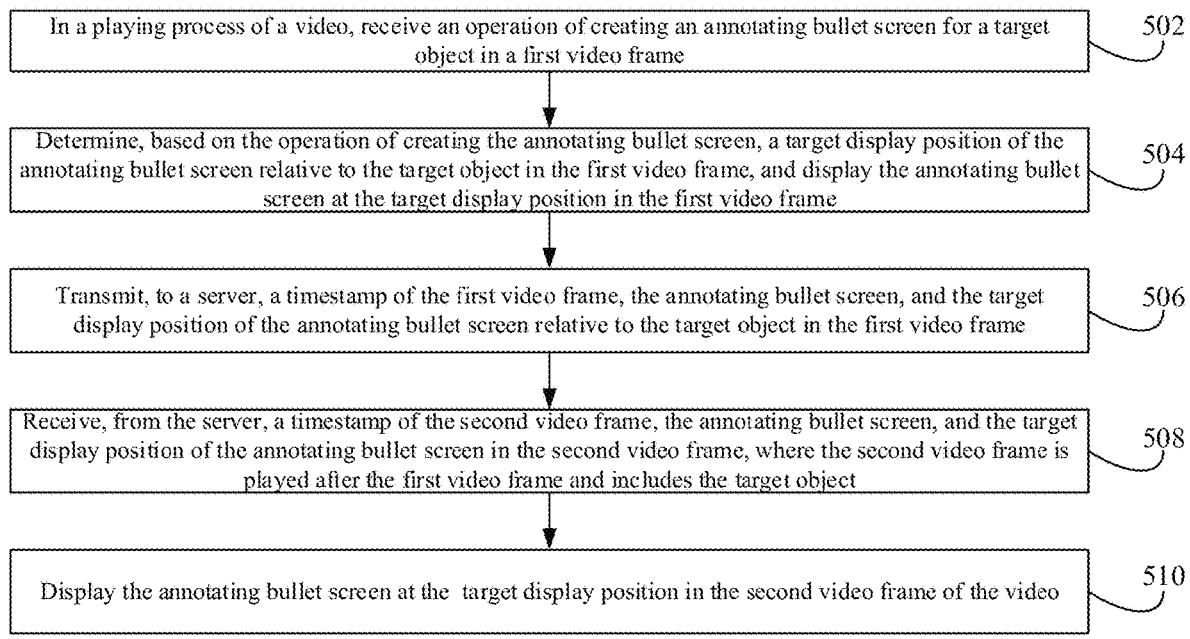
FIG. 5 is a flowchart of a third video annotating method according to an embodiment of the present disclosure.

FIG. 5 is a flowchart of a third video annotating method according to an embodiment of the present disclosure, which is applied to a client. The video annotating method includes the following steps 502 to 510.

In step 502, in a playing process of a video, an operation of creating an annotating bullet screen for a target object in a first video frame is received.

It is to be noted that an implementation process of step 502 is the same as the implementation process of step 102 described above, and is not repeated in the present disclosure.

In step 504, a target display position of the annotating bullet screen relative to the target object in the first video frame is determined based on the operation of creating the annotating bullet screen, and the annotating bullet screen is displayed at the target display position of the first video frame.

It is to be noted that an implementation process of step 504 is the same as the implementation process of step 104 described above, and is not repeated in the present disclosure.

In step 506, a time stamp of the first video frame, the annotating bullet screen, and the target display position of the annotating bullet screen relative to the target object in the first video frame are transmitted to a server.

In practice, in a case that a user creates and displays an annotating bullet screen for a target object through a client, the client may determine a timestamp of a current video frame (that is, the first video frame) for which the annotating bullet screen is created, and the client may transmit the determined timestamp of the first video frame, the annotating bullet screen, and the target display position of the annotating bullet screen relative to the target object in the first video frame the server, so that the server may perform recognition and determination. That is, after the user performs an annotation on the client, the client may transmit the position annotated by the user to the server, and the server determines a display position of the annotating bullet screen in a subsequent video frame (that is, the server implements object following).

It is to be noted that the target object may or may not move. In this embodiment, there is no limitation on whether the target object moves. For any target object, regardless of whether the target object moves, the client directly determines the target display position of the annotating bullet screen relative to the target object in the first video frame, and directly transmit the target display position of the annotating bullet screen relative to the target object in the first video frame to the server.

In step 508, a timestamp of a second video frame, the annotating bullet screen, and a target display position of the annotating bullet screen in the second video frame are received from the server, where the second video frame is played after the first video frame and includes the target object.

Specifically, after the client transmits the time stamp of the first video frame, the annotating bullet screen, and the target display position of the annotating bullet screen relative to the target object in the first video frame to the server, the server may determine the second video frame in the video based on the time stamp of the first video frame, and determine the target display position of the annotating bullet screen in the second video frame based on the target display position of the annotating bullet screen relative to the target object in the first video frame, and then the server may return the time stamp of the second video frame, the annotating bullet screen and the target display position of the annotating bullet screen in the second video frame to the client, so that the client may display the annotating bullet screen based on the time stamp and a corresponding target display position in the playing process of the video.

In the present disclosure, the server may determine the target display position of the annotating bullet screen in the second video frame, and the client only needs to display the annotating bullet screen based on the timestamp of the second video frame and the corresponding target display position that are returned by the server, and it is unnecessary for the client to determine the target display position of the annotating bullet screen in the second video frame in real time by following the target object, which saves the processing resources of the client.

In addition, in addition to returning the timestamp of the second video frame, the annotating bullet screen, and the target display position of the annotating bullet screen in the second video frame to the client that creates the annotating bullet screen, the server may transmit, while transmitting a video stream to another client (all clients requesting to play the video stream), a timestamp (including the timestamps of the first video frame and the second video frame), the annotating bullet screen, and the target display position (including the target display position in the first video frame and the second video frame) of the annotating bullet screen to the client, so that all clients displaying the video can display the annotating bullet screen simultaneously, which is convenient for synchronous interaction, thereby facilitating explanation and prompting to the video content, thus greatly improving the user experience.

In step 510, the annotating bullet screen is displayed at the target display position in the second video frame of the video.

It is to be noted that after receiving the time stamp of the second video frame, the annotating bullet screen, and the target display position of the annotating bullet screen in the second video frame, the client may continually display the annotating bullet screen at the corresponding target display position based on the timestamp in the playing process of the video, thereby realizing annotation and following of the target object.

With the video annotating method in the present disclosure, the user may create an annotating bullet screen for the target object, to annotate the target object, and the annotating bullet screen may be continuously displayed at a position corresponding to the target object in a subsequent video frame. That is, a function to annotate the target object in the video is provided through the annotating bullet screen, and the annotating bullet screen may be displayed in the second video frame by following the target object, such that a viewer can be reminded to pay attention to the target object in a subsequent part of the video, thereby facilitating explanation and prompting to the video content, thus greatly improving the user experience. In addition, the server may determine the target display position of the annotating bullet screen in the second video frame, and the client only needs to display the annotating bullet screen based on the timestamp of the second video frame and the corresponding target display position that are returned by the server, and it is unnecessary for the client to determine the target display position of the annotating bullet screen in the second video frame in real time by following the target object, which saves the processing resources of the client.

Figure 6:
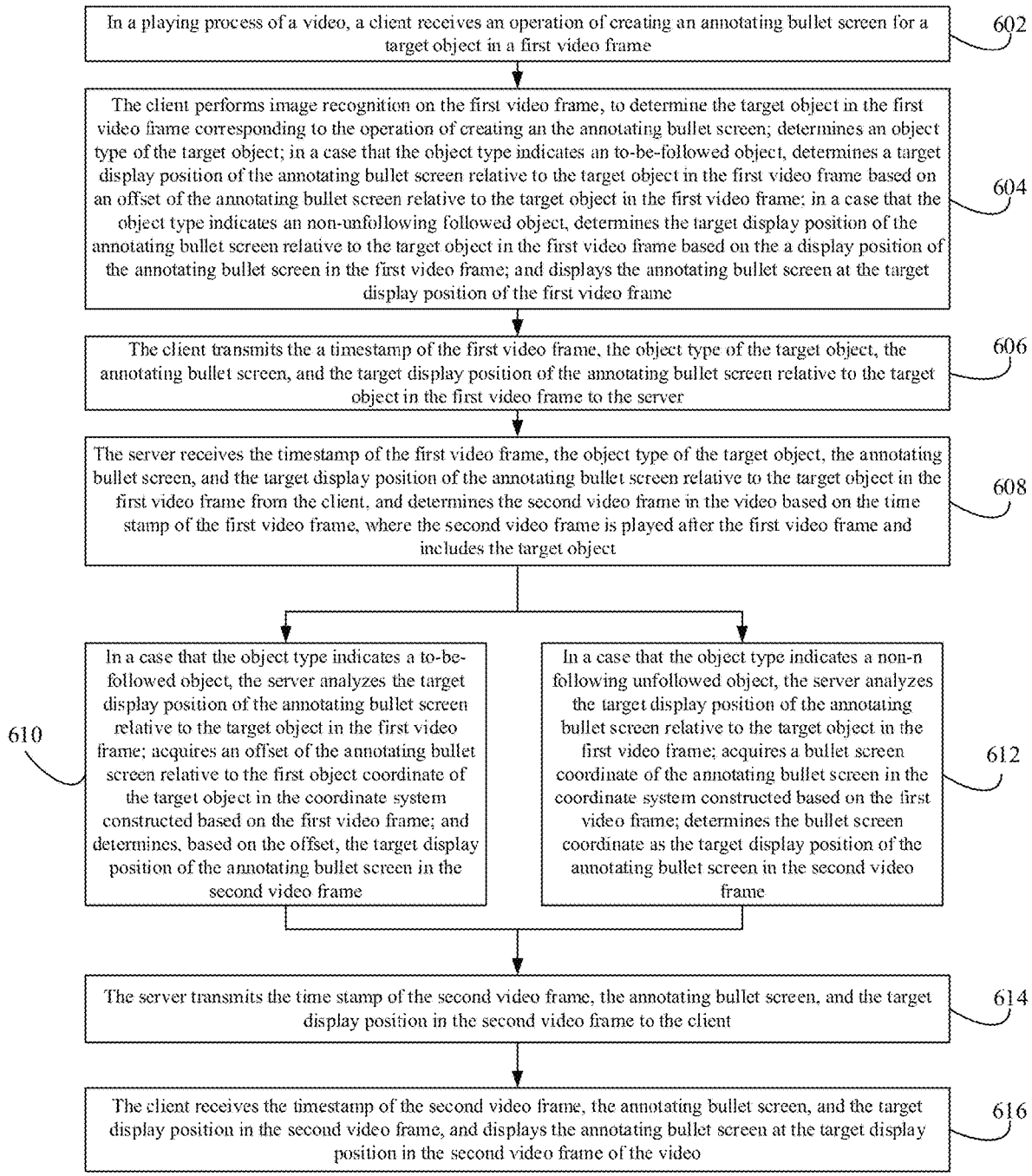
FIG. 6 is a flowchart of a fourth video annotating method according to an embodiment of the present disclosure.

FIG. 6 is a flowchart of a fourth video annotating method according to an embodiment of the present disclosure. The video annotating method includes the following steps 602 to 616.

In step 602, in a playing process of a video, a client receives an operation of creating an annotating bullet screen for a target object in a first video frame.

It is to be noted that an implementation process of step 602 is the same as the implementation process of step 102 described above, and is not repeated in the present disclosure.

In step 604, the client performs image recognition on the first video frame, to determine the target object in the first video frame corresponding to the operation of creating the annotating bullet screen; determines an object type of the target object; in a case that the object type indicates a to-be-followed object, determines a target display position of the annotating bullet screen relative to the target object in the first video frame based on an offset of the annotating bullet screen relative to the target object in the first video frame; in a case that the object type indicates an unfollowed object, determines the target display position of the annotating bullet screen relative to the target object in the first video frame based on a display position of the annotating bullet screen in the first video frame; and displays the annotating bullet screen at the target display position of the first video frame.

It is to be noted that an implementation process of step 604 is similar to the implementation process of step 404 described above, and is not repeated in the present disclosure.

In step 606, the client transmits a timestamp of the first video frame, the object type of the target object, the annotating bullet screen, and the target display position of the annotating bullet screen relative to the target object in the first video frame to the server.

It is to be noted that the target object may or may not move. In this embodiment, after determining the object type of the target object, the client may also transmit the object type to the server, so that the server may determine the target display position in the second video frame in different ways for different object types (to-be-followed and unfollowed), thereby saving the processing resources of the server.

In step 608, the server receives the timestamp of the first video frame, the object type of the target object, the annotating bullet screen, and the target display position of the annotating bullet screen relative to the target object in the first video frame from the client, and determines the second video frame in the video based on the time stamp of the first video frame, where the second video frame is played after the first video frame and includes the target object.

It is to be noted that the server may determine the timestamp of the first video frame, determine, based on the timestamp, all video frames in the video that are displayed later than the timestamp, and then perform image recognition on all the video frames that are displayed later than the timestamp, then the server determines, from all the video frames that are displayed later than the timestamp, a video frame that includes the target object as the second video frame.

In step 610, in a case that the object type indicates a to-be-followed object, the server analyzes the target display position of the annotating bullet screen relative to the target object in the first video frame; acquires an offset of the annotating bullet screen relative to the first object coordinate of the target object in the coordinate system constructed based on the first video frame; and determines, based on the offset, the target display position of the annotating bullet screen in the second video frame.

It is to be noted that in a case that the object type of the target object indicates a to-be-followed object, the client determines the target display position of the annotating bullet screen relative to the target object in the first video frame, that is, the target display position actually indicates the offset of the first object coordinate of the annotating bullet screen relative to the target object in the coordinate system. In this case, the target display position of the annotating bullet screen in the first video frame is analyzed, to acquire the offset of the annotating bullet screen relative to the target object. In the subsequent process, as long as the second object coordinate of the target object in the second video frame is determined, the target display position of the annotating bullet screen in the second video frame can be determined based on the offset.

In an alternative implementation of the embodiment, the target display position of the annotating bullet screen in the second video frame is determined based on the offset in the following way:

performing image recognition on the second video frame, to determine the target object in the second video frame;

determining, in the coordinate system, a second object coordinate of the target object in the second video frame;

determining a display coordinate of the target display position in the coordinate system based on the offset and the second object coordinate; and displaying the display coordinate as the target display position of the annotating bullet screen in the second video frame.

It is to be noted that an implementation process of determining the target display position of the annotating bullet screen in the second video frame based on the offset in step 610 is similar to the implementation process of displaying the annotating bullet screen at the target display position in the second video frame of the video in step 106, an execution body of step 106 is the client, and the execution body of step 610 is the server, which is not repeated in the present disclosure.

In step 612, in a case that the object type indicates an unfollowed object, the server analyzes the target display position of the annotating bullet screen relative to the target object in the first video frame; acquires a bullet screen coordinate of the annotating bullet screen in the coordinate system constructed based on the first video frame; determines the bullet screen coordinate as the target display position of the annotating bullet screen in the second video frame.

It is to be noted that if the object type of the target object indicates an unfollowed object, the client determines the display position of the annotating bullet screen in the first video frame, that is, the target display position actually indicates a bullet screen coordinate of the annotating bullet screen in the coordinate system. In this case, the target display position of the annotating bullet screen relative to the target object in the first video frame is analyzed, to acquire the bullet screen coordinate of the annotating bullet screen in the coordinate system, and the bullet screen coordinate is directly determined as the target display position of the annotating bullet screen in the second video frame.

In step 614, the server transmits a time stamp of the second video frame, the annotating bullet screen, and the target display position in the second video frame to the client.

In step 616, the client receives the timestamp of the second video frame, the annotating bullet screen, and the target display position in the second video frame, and displays the annotating bullet screen at the target display position in the second video frame of the video.

With the video annotating method in the present disclosure, the user may create an annotating bullet screen for the target object, to annotate the target object, and the annotating bullet screen may be continuously displayed at a position corresponding to the target object in a subsequent video frame. That is, a function to annotate the target object in the video is provided through the annotating bullet screen, and the annotating bullet screen may be displayed in the second video frame by following the target object, such that a viewer can be reminded to pay attention to the target object in a subsequent part of the video, thereby facilitating explanation and prompting to the video content, thus greatly improving the user experience. In addition, the server may determine the target display position of the annotating bullet screen in the second video frame, and the client only needs to display the annotating bullet screen based on the timestamp of the second video frame and the corresponding target display position that are returned by the server, and it is unnecessary for the client to determine the target display position of the annotating bullet screen in the second video frame in real time by following the target object, which saves the processing resources of the client. Further, the client may transmit the determined object type of the target object to the server, so that the server may determine the target display position in the second video frame in different ways for different object types, thereby saving the processing resources of the server.

Figure 7:
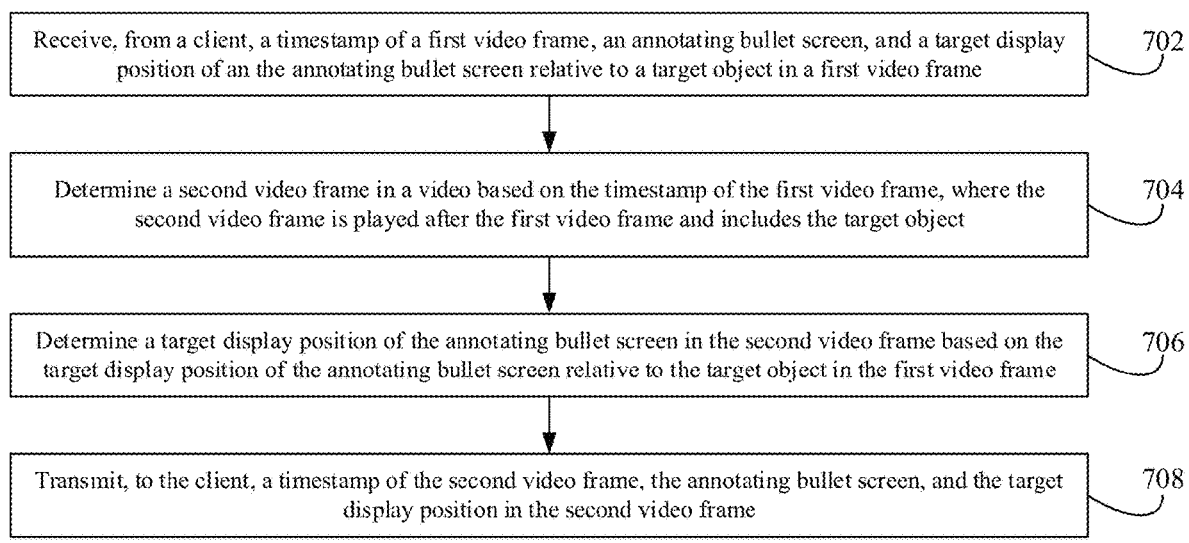
FIG. 7 is a flowchart of a fifth video annotating method according to an embodiment of the present disclosure.

FIG. 7 is a flowchart of a fifth video annotating method according to an embodiment of the present disclosure, which is applied to a server. The video annotating method includes the following steps 702 to 708.

In step 702, a timestamp of the first video frame, the annotating bullet screen, and the target display position of the annotating bullet screen relative to the target object in the first video frame are received from the client.

In step 704, a second video frame in the video is determined based on the time stamp of the first video frame, where the second video frame is played after the first video frame and includes the target object.

In step 706, the target display position of the annotating bullet screen in the second video frame is determined based on the target display position of the annotating bullet screen relative to the target object in the first video frame.

In step 708, the time stamp of the second video frame, the annotating bullet screen, and the target display position in the second video frame are transmitted to the client.

With the video annotating method in the present disclosure, the server determines the target display position of the annotating bullet screen in the second video frame, and the client only needs to display the annotating bullet screen based on the time stamp of the second video frame and the corresponding target display position that are returned by the server, and it is unnecessary for the client to determine the target display position of the annotating bullet screen in the second video frame in real time by following the target object, thereby saving the processing resources of the client.

Figure 8:
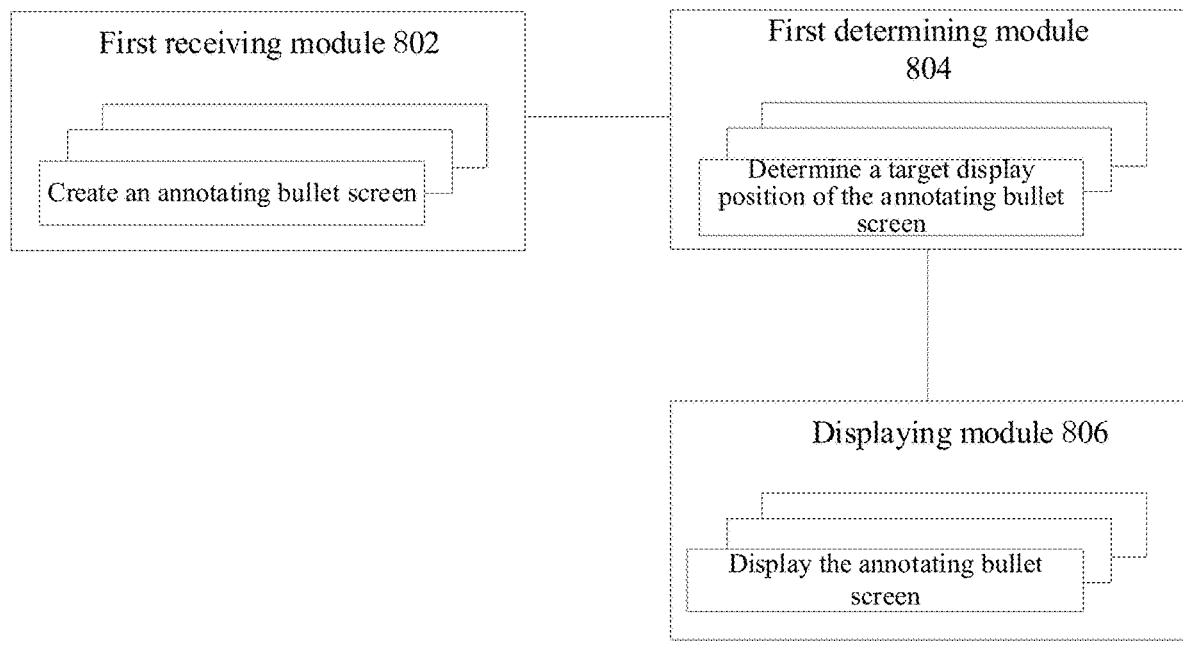
FIG. 8 is a schematic structural diagram of a video annotating client according to an embodiment of the present disclosure.

Corresponding to the foregoing method embodiments, a video annotating client is further provided according to an embodiment of the present disclosure. FIG. 8 is a schematic structural diagram of a video annotating client according to an embodiment of the present disclosure. As shown in FIG. 8, the client includes: a first receiving module 802, a first determining module 804, and a displaying module 806. The first receiving module 802 is configured to receive an operation of creating an annotating bullet screen for a target object in a first video frame in a playing process of a video. The first determining module 804 is configured to determine a target display position of the annotating bullet screen relative to the target object in the first video frame based on the operation of creating the annotating bullet screen, and display the annotating bullet screen at the target display position in the first video frame. The displaying module 806 is configured to display the annotating bullet screen at a target display position in a second video frame of the video, where the second video frame is played after the first video frame and includes the target object.

In an embodiment, the first determining module 804 is further configured to:
  perform image recognition on the first video frame, to determine the target object in the first video frame corresponding to the operation of creating the annotating bullet screen;
  determine an object type of the target object;
  in a case that the object type indicates a to-be-followed object, determine the target display position of the annotating bullet screen relative to the target object in the first video frame based on an offset of the annotating bullet screen relative to the target object in the first video frame;
  in a case that the object type indicates an unfollowed object, determine the target display position of the annotating bullet screen relative to the target object in the first video frame based on a display position of the annotating bullet screen in the first video frame.

In an embodiment, the first determining module 804 is further configured to:
  construct a coordinate system based on the first video frame, and determine a first object coordinate of the target object in the coordinate system;
  determine an offset of the annotating bullet screen relative to the first object coordinate in the coordinate system; and
  determine the offset of the annotating bullet screen relative to the first object coordinate in the coordinate system as the target display position.

In an embodiment, the displaying module 806 is further configured to:
  perform image recognition on the second video frame, to determine the target object in the second video frame;
  determine, in the coordinate system, a second object coordinate of the target object in the second video frame;
  determine the display coordinate of the target display position in the coordinate system based on the offset and the second object coordinate;
  display the annotating bullet screen at the display coordinate.

In an embodiment, the first determining module 804 is further configured to:
  construct a coordinate system based on the first video frame, and determine a bullet screen coordinate of the annotating bullet screen in the coordinate system; and
  determine the bullet screen coordinate as the target display position.

In an embodiment, the client further includes: a second transmitting module and a third receiving module. The second transmitting module is configured to transmit a timestamp of the first video frame, the annotating bullet screen, and the target display position of the annotating bullet screen relative to the target object in the first video frame to a server. The third receiving module is configured to receive a timestamp of a second video frame, the annotating bullet screen, and a target display position of the annotating bullet screen in the second video frame from the server.

In an embodiment, the client further includes: a third transmitting module and a fourth receiving module. The third transmitting module is configured to transmit the timestamp of the first video frame, an object type of the target object, the annotating bullet screen and the target display position of the annotating bullet screen relative to the target object in the first video frame to the server. The fourth receiving module is configured to receive the timestamp of the second video frame, the annotating bullet screen, and the target display position of the annotating bullet screen in the second video frame from the server.

In an embodiment, the first receiving module 802 is further configured to:
display, based on a first display parameter, the annotating bullet screen at the target display position in the first video frame, where the first display parameter is different from a display parameter of a text bullet screen.

In an embodiment, the first receiving module 802 is further configured to:
create an annotation layer in an annotation mode, and receive, through the annotation layer, the operation of creating the annotating bullet screen for the target object in the first video frame.

With the video annotating client in the present disclosure, in a playing process of a video, an operation of creating an annotating bullet screen for a target object in a first video frame may be received. A target display position of the annotating bullet screen relative to the target object in the first video frame is determined based on the operation of creating the annotating bullet screen, and the annotating bullet screen is displayed at the target display position in the first video frame. The annotating bullet screen is displayed at a target display position in a second video frame of the video, where the second video frame is played after the first video frame and includes the target object. In this case, the user may create an annotating bullet screen for the target object, to annotate the target object, and the annotating bullet screen may be continuously displayed at a position corresponding to the target object in a subsequent video frame. That is, a function to annotate the target object in the video is provided through the annotating bullet screen, and the annotating bullet screen may be displayed in the second video frame by following the target object, such that a viewer can be reminded to pay attention to the target object in a subsequent part of the video, thereby facilitating explanation and prompting to the video content, thus greatly improving the user experience.

A technical solution of the video annotating client in the embodiment is schematically described in the above. It is to be noted that the technical solution of the video annotating client belongs to the same concept as the technical solution of the above video annotating method. For details that are not described in detail in the technical solution of the video annotating client, reference may be made to the description of the technical solution of the above video annotating method.

Figure 9:
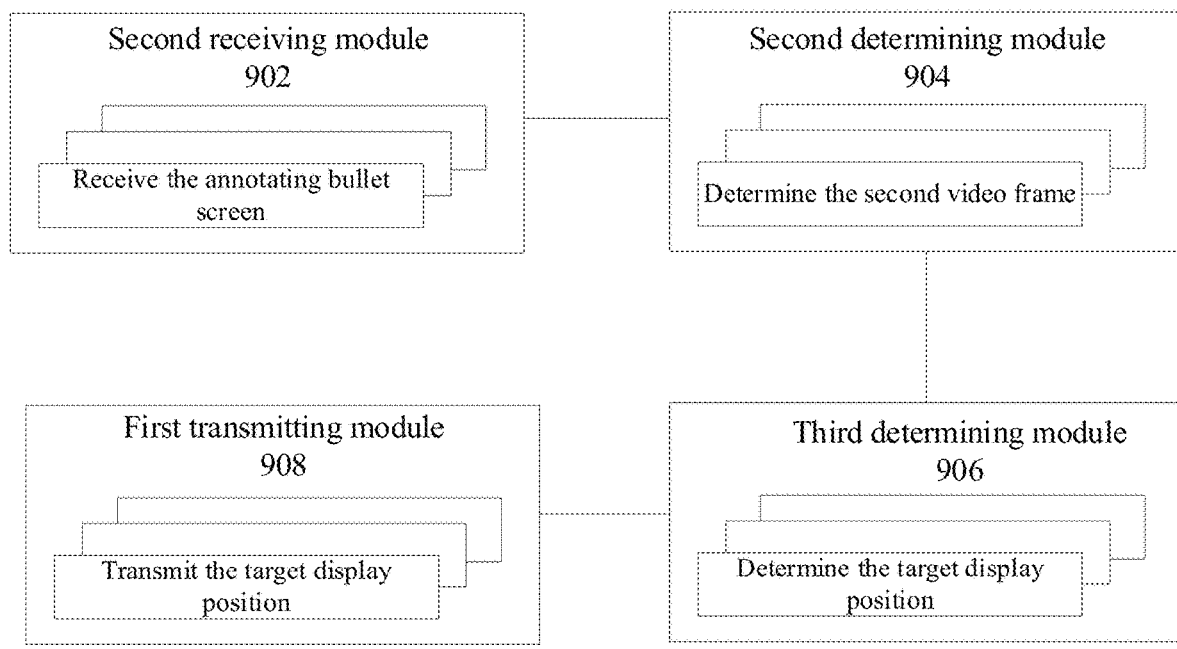
FIG. 9 is a schematic structural diagram of a video annotating server according to an embodiment of the present disclosure.

Corresponding to the above method embodiment, a video annotating server is further provided according to an embodiment of the present disclosure. FIG. 9 is a schematic structural diagram of a video annotating server according to an embodiment of the present disclosure. As shown in FIG. 9, the server includes: a second receiving module 902, second determining module 904, a third determining module 906, and a first transmitting module 908. The second receiving module 902 is configured to receive a timestamp of a first video frame, an annotating bullet screen, and a target display position of the annotating bullet screen relative to a target object in a first video frame from a client. The second determining module 904 is configured to determine a second video frame in a video based on the timestamp of the first video frame, where the second video frame is played after the first video frame and includes the target object. The third determining module 906 is configured to determine a target display position of the annotating bullet screen in the second video frame based on the target display position of the annotating bullet screen relative to the target object in the first video frame. The first transmitting module 908 is configured to transmit a timestamp of the second video frame, the annotating bullet screen, and a target display position in the second video frame to the client.

In an embodiment, the server further includes a fifth receiving module. The fifth receiving module is configured to receive an object type of the target object.

In an embodiment, the third determining module 906 is further configured to:
in the case that the object type indicates a to-be-followed object, analyze the target display position of the annotating bullet screen relative to the target object in the first video frame;
determine an offset of a first object coordinate of the annotating bullet screen relative to the target object in a coordinate system constructed based on the first video frame; and
determine, based on the offset, a target display position of the annotating bullet screen in the second video frame.

In an embodiment, the third determining module 906 is further configured to:
in a case that the object type indicates an unfollowed object, analyze the target display position of the annotating bullet screen relative to the target object in the first video frame;
determine a bullet screen coordinate of the annotating bullet screen in the coordinate system constructed based on the first video frame; and
determine the bullet screen coordinate as the target display position of the annotating bullet screen in the second video frame.

In an embodiment, the third determining module 906 is further configured to:
perform image recognition on the second video frame to determine the target object in the second video frame;
determine, in the coordinate system, a second object coordinate of the target object in the second video frame;
determine a display coordinate of the target display position in the coordinate system based on the offset and the second object coordinate; and
determine the display coordinate as the target display position of the annotating bullet screen in the second video frame.

With the video annotating server in the present disclosure, the server may determine the target display position of the annotating bullet screen in the second video frame, and the client only needs to display the annotating bullet screen based on the timestamp of the second video frame and the corresponding target display position that are returned by the server, and it is unnecessary for the client to determine the target display position of the annotating bullet screen in the second video frame in real time by following the target object, which saves the processing resources of the client.

A technical solution of the video annotating server in the embodiment is schematically described in the above. It is to be noted that the technical solution of the video annotating server belongs to the same concept as the technical solution of the above video annotating method. For details that are not described in detail in the technical solution of the video annotating server, reference may be made to the description of the technical solution of the above video annotating method.

Figure 10:
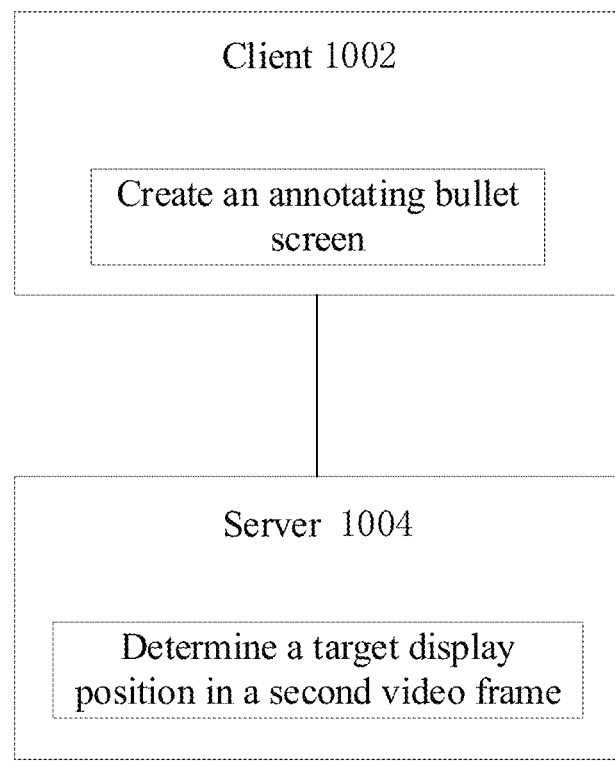
FIG. 10 is a schematic structural diagram of a video annotating system according to an embodiment of the present disclosure.

Corresponding to the above method embodiment, a video annotating system is further provided according to an embodiment of the present disclosure. FIG. 10 is a schematic structural diagram of a video annotating system according to an embodiment of the present disclosure. As shown in FIG. 10, the system includes: a client 1002 and a server 1004. The client 1002 is configured to: receive an operation of creating an annotating bullet screen for a target object in a first video frame in a playing process of a video; determine, based on the operation of creating the annotating bullet screen, a target display position of the annotating bullet screen relative to the target object in the first video frame, and display the annotating bullet screen at the target display position in the first video frame; transmit a timestamp of the first video frame, the annotating bullet screen, the target display position of the annotating bullet screen relative to the target object in the first video frame to the server. The server 1004 is configured to: receive the timestamp of the first video frame, the annotating bullet screen, and the target display position of the annotating bullet screen relative to the target object in the first video frame from the client; determine a second video frame in the video based on the timestamp of the first video frame, where the second video frame is played after the first video frame and includes the target object; determine, based on the target display position of the annotating bullet screen relative to the target object in the first video frame, a target display position of the annotating bullet screen in the second video frame; and transmit a timestamp of the second video frame, the annotating bullet screen, and the target display position of the annotating bullet screen in the second video frame to the client. The client 1002 is further configured to receive the timestamp of the second video frame, the annotating bullet screen, and the target display position of the annotating bullet screen in the second video frame from the server; and display the annotating bullet screen at the target display position in the second video frame.

With the video annotating system in the present disclosure, the user may create an annotating bullet screen for the target object, to annotate the target object, and the annotating bullet screen may be continuously displayed at a position corresponding to the target object in a subsequent video frame. That is, a function to annotate the target object in the video is provided through the annotating bullet screen, and the annotating bullet screen may be displayed in the second video frame by following the target object, such that a viewer can be reminded to pay attention to the target object in a subsequent part of the video, thereby facilitating explanation and prompting to the video content, thus greatly improving the user experience. In addition, the server may determine the target display position of the annotating bullet screen in the second video frame, and the client only needs to display the annotating bullet screen based on the timestamp of the second video frame and the corresponding target display position that are returned by the server, and it is unnecessary for the client to determine the target display position of the annotating bullet screen in the second video frame in real time by following the target object, which saves the processing resources of the client.

A technical solution of the video annotating system in the embodiment is schematically described in the above. It is to be noted that the technical solution of the video annotating system belongs to the same concept as the technical solution of the above video annotating method. For details that are not described in detail in the technical solution of the video annotating system, reference may be made to the description of the technical solution of the above video annotating method.

Figure 11:
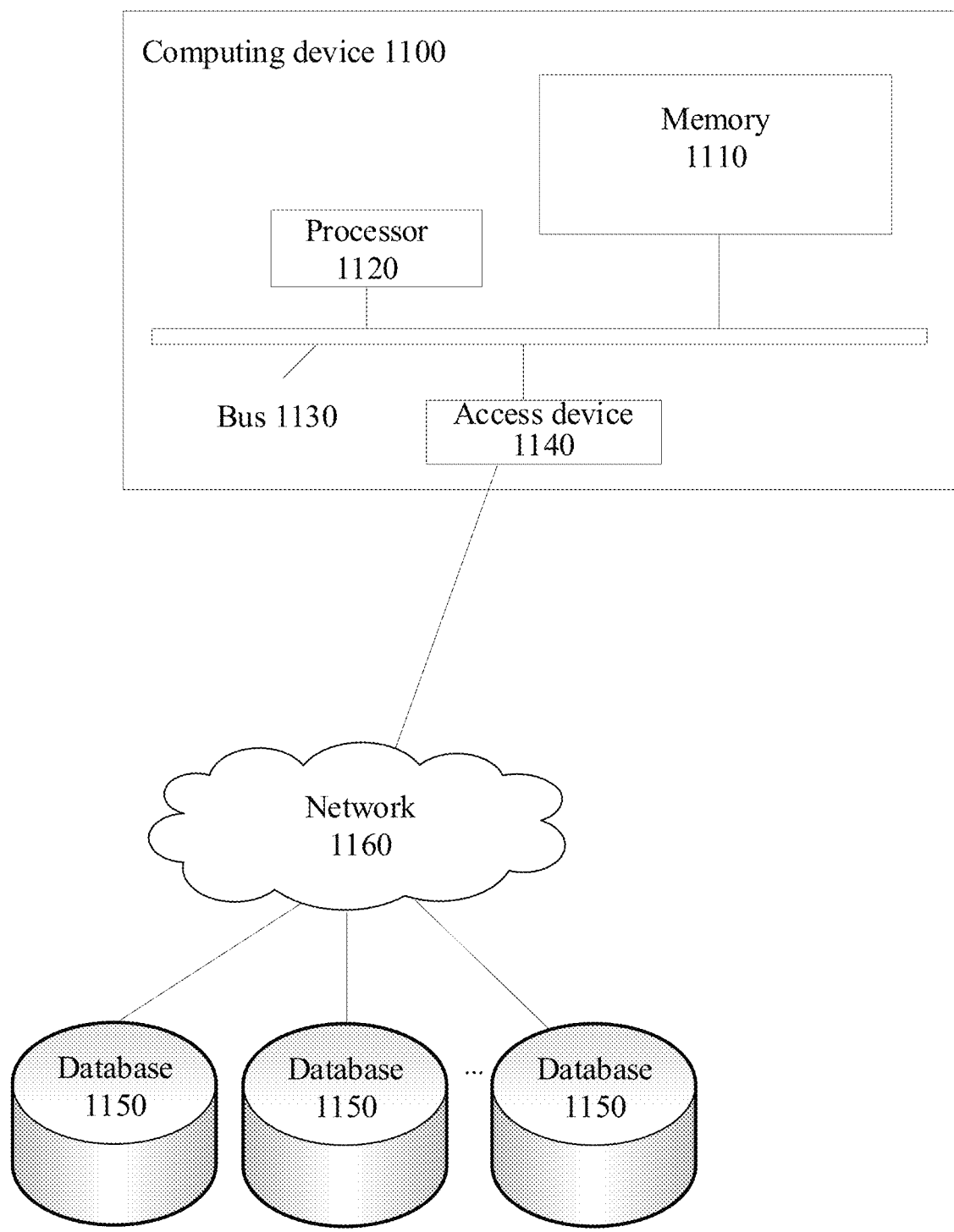
FIG. 11 is a structural block diagram of a computing device according to an embodiment of the present disclosure.

FIG. 11 is a structural block diagram of a computing device 1100 according to an embodiment of the present disclosure. The components of the computing device 1100 include but are not limited to a memory 1110 and a processor 1120. The processor 1120 and the memory 1110 are connected to each other through a bus 1130, and the database 1150 is used to store data.

The computing device 1100 further includes an access device 1140, which enables the computing device 1100 to communicate via one or more networks 1160. Examples of these networks include a public switched telephone network (PSTN), a local area network (LAN), a wide area network (WAN), a personal area network (PAN), or a combination of communication networks such as the Internet. The access device 1140 may include one or more of any type of wired or wireless network interfaces (for example, a network interface card (NIC)), such as an IEEE802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, and a near field communication (NFC) interface.

In an embodiment of the present disclosure, the above described components of the computing device 1100 may also be connected to other components not shown in FIG. 11, for example, via a bus. It is to be understood that the structural block diagram of the computing device shown in FIG. 11 is only for the purpose of example, and is not intended to limit the scope of the present disclosure. Those skilled in the art may add or replace other components as needed.

The computing device 1100 may be any type of stationary or mobile computing device, including a mobile computer or a mobile computing device (for example, a tablet computers, a personal digital assistant, a laptop computer, a notebook computer, and a netbook), a mobile phone (for example, a smart phone), a wearable computing device (for example, a smart watch, smart glasses) or other types of mobile devices, or a stationary computing device such as a desktop computer or a PC. The computing device 1100 may also be a mobile or stationary server.

The processor 1120 is configured to execute computer-executable instructions to perform steps of the video annotating method as shown in FIG. 1, FIG. 4, FIG. 5, or FIG. 7.

A technical solution of the computing device in the embodiment is schematically described in the above. It is to be noted that the technical solution of the computing device belongs to the same concept as the technical solution of the above video annotating method. For details that are not described in detail in the technical solution of the computing device, reference may be made to the description of the technical solution of the above video annotating method.

A computer-readable storage medium is further provided according to an embodiment of the present disclosure, which stores computer instructions. The computer instructions, when executed by a processor, perform steps of the video annotating method as shown in FIG. 1, FIG. 4, FIG. 5, or FIG. 7.

A technical solution of the computer-readable storage medium in the embodiment is schematically described in the above. It is to be noted that the technical solution of the computer-readable storage medium belongs to the same concept as the technical solution of the above video annotating method. For details that are not described in detail in the technical solution of the computer-readable storage medium, reference may be made to the description of the technical solution of the above video annotating method.

Specific embodiments of the present disclosure are described in the above, and other embodiments are also within the scope of the claims. In some cases, actions or steps described in the claims may be performed in a different order than in the embodiments and still achieve desired results. In addition, processes shown in the drawings are not necessarily performed in the specific order or sequential order in order to achieve the desired results. In some embodiments, multi-task processing and parallel processing are also possible or may be advantageous.

The computer instructions include computer program codes, and the computer program codes may be in the form of source codes, object codes, executable files, or some intermediate forms. The computer-readable medium may include: any entity or device capable of carrying the computer program codes, a recording medium, a U disk, a mobile hard disk, a magnetic disk, an optical disk, a computer memory, a read-only memory (ROM), a random access memory (RAM), an electrical carrier signal, a telecommunication signal, and a software distribution medium, and the like. It is to be noted that the content contained in the computer-readable medium may be appropriately added or deleted based on the requirements of the legislation and patent practice in the jurisdiction. For example, in some jurisdictions, based on the legislation and patent practice, the computer-readable medium does not include electrical carrier signals and telecommunication signals.

It is to be noted that, for simplicity of description, the above method embodiments are described as combinations of a series of operations, but those skilled in the art should know that the present disclosure is not limited to the described sequence of operations. According to on the present disclosure, some steps may be performed in another order or at simultaneously. Secondly, those skilled in the art should also know that the embodiments described in this specification are all preferred embodiments, and the operations and modules involved are not necessarily all required by the present disclosure.

In the above embodiments, the description of each embodiment has its own emphasis. For parts that are not described in detail in an embodiment, reference may be made to related descriptions in the other embodiments.

The preferred embodiments of the present disclosure disclosed above are only used to help explain the present disclosure. Details of the present disclosure are not descried completely in the preferred embodiments, and the present disclosure is not limit to the preferred embodiments described above. Apparently, many modifications and changes may be made based on the content of this specification. These preferred embodiments are selected and specifically described in this specification, in order to better explain the principles and practical applications of the present disclosure, so that those skilled in the art may understand and use the present disclosure. The present disclosure is only limited by the claims and full scope and equivalents thereof

What is claimed is:

1. A computer-implemented method of annotating a video, comprising:
   receiving input indicative of an operation of creating a bullet screen configured to annotate a target object in a first frame of the video, wherein the bullet screen comprises content to annotate the target object, and wherein the input comprises information identifying the target object in the first frame;
   determining a display position of the bullet screen in the first frame based on the information identifying the target object during the operation of creating the bullet screen;
   displaying the bullet screen at the display position in the first frame;
   determining an offset of the display position of the bullet screen relative to a position of the target object in the first frame; and
   displaying the bullet screen at a target display position in a second frame of the video, wherein the target display position in the second frame is determined based on the offset of the display position of the bullet screen relative to the position of the target object in the first frame, the second frame is played subsequent to the first frame, and the second frame comprises the target object.

2. The method of claim 1, further comprising:
   performing image recognition on the first frame and determining the target object in the first frame; and
   determining a first set of coordinates of the target object indicating the position of the target object in the first frame.

3. The method of claim 1, further comprising:
   performing image recognition on the second frame and determining the target object in the second frame;
   determining a second set of coordinates of the target object indicating a position of the target object in the second frame; and
   determining the target display position of the bullet screen in the second frame based on the offset of the display position of the bullet screen relative to the position of the target object in the first frame and the second set of coordinates of the target object.

4. The method of claim 1, wherein after displaying the bullet screen at the display position in the first frame, the method further comprises:
   transmitting, to a server computing device, information indicating a timestamp of the first frame, the bullet screen, and the display position of the bullet screen in the first frame; and
   receiving, from the server computing device, information indicating a timestamp of the second frame, the bullet screen, and the target display position of the bullet screen in the second frame.

5. The method of claim 1, further comprising:
   creating an annotation layer in an annotation mode; and
   receiving, through the annotation layer, the operation of creating the bullet screen configured to annotate the target object in the first frame.

6. The method of claim 1, further comprising:
displaying the bullet screen in the first frame and the second frame based on at least one display parameter, wherein the at least one display parameter is different from one or more display parameters associated with a text bullet screen.

7. The method of claim 1, wherein a shape of the bullet screen at least partially overlaps the target object when the bullet screen is displayed in the first frame and the second frame.

8. A computer-implemented method of annotating a video, comprising:
receiving, by a server computing device, from a client computing device, information indicating a timestamp of a first frame of the video, a bullet screen of annotating a target object in the first frame, and information indicating a display position of the bullet screen in the first frame, wherein the bullet screen comprises content to annotate the target object;
determining, by the server computing device, a second frame of the video based on the timestamp of the first frame, wherein the second frame is played subsequent to the first frame, and the second frame comprises the target object;
determining, by the server computing device, a target display position of the bullet screen in the second frame based on an offset of the display position of the bullet screen relative to a position of the target object in the first frame; and
transmitting, by the server computing device, to the client computing device, information indicating a timestamp of the second frame, the bullet screen, and the target display position of the bullet screen in the second video frame.

9. The method of claim 8, further comprising:
performing image recognition on the second frame and determining a position of the target object in the second frame; and
determining the target display position of the bullet screen in the second frame based on the offset and the position of the target object in the second frame.

10. A system, comprising:
at least one processor; and
at least one memory communicatively coupled to the at least one processor and comprising computer-readable instructions that upon execution by the at least one processor cause the at least one processor to perform operations comprising:
receiving input indicative of an operation of creating a bullet screen configured to annotate a target object in a first frame of the video, wherein the bullet screen comprises content to annotate the target object, and wherein the input comprises information identifying the target object in the first frame;
determining a display position of the bullet screen in the first frame based on the information identifying the target object during the operation of creating the bullet screen;
displaying the bullet screen at the display position in the first frame;
determining an offset of the display position of the bullet screen relative to a position of the target object in the first frame; and
displaying the bullet screen at a target display position in a second frame of the video, wherein the target display position in the second frame is determined based on the offset of the display position of the bullet screen relative to the position of the target object in the first frame, the second frame is played subsequent to the first frame, and the second frame comprises the target object.

11. The system of claim 10, the operations further comprising:
performing image recognition on the first frame and determining the target object in the first frame; and
determining a first set of coordinates of the target object indicating the position of the target object in the first frame.

12. The system of claim 10, the operations further comprising:
performing image recognition on the second frame and determining the target object in the second frame;
determining a second set of coordinates of the target object indicating a position of the target object in the second frame; and
determining the target display position of the bullet screen in the second frame based on the offset of the display position of the bullet screen relative to the position of the target object in the first frame and the second set of coordinates of the target object.

13. The system of claim 10, wherein after displaying the bullet screen at the display position in the first frame, the operations further comprise:
transmitting, to a server computing device, information indicating a timestamp of the first frame, the bullet screen, and the display position of the bullet screen in the first frame; and
receiving, from the server computing device, information indicating a timestamp of the second frame, the bullet screen, and the target display position of the bullet screen in the second frame.

14. The system of claim 10, the operations further comprising:
creating an annotation layer in an annotation mode; and
receiving, through the annotation layer, the operation of creating the bullet screen configured to annotate the target object in the first frame.

15. The system of claim 10, the operations further comprising:
displaying the bullet screen in the first frame and the second frame based on at least one display parameter, wherein the at least one display parameter is different from one or more display parameters associated with a text bullet screen.

16. The system of claim 10, wherein a shape of the bullet screen at least partially overlaps the target object when the bullet screen is displayed in the first frame and the second frame.

17. A system, comprising:
at least one processor; and
at least one memory communicatively coupled to the at least one processor and comprising computer-readable instructions that upon execution by the at least one processor cause the at least one processor to perform operations comprising:
receiving, from a client computing device, information indicating a timestamp of a first frame of the video, a bullet screen containing content annotating a target object in the first frame, and information indicating a display position of the bullet screen in the first frame;
determining a second frame of the video based on the timestamp of the first frame, wherein the second frame is played subsequent to the first frame, and the second frame comprises the target object;

determining a target display position of the bullet screen in the second frame based on an offset of the display position of the bullet screen relative to a position of the target object in the first frame; and transmitting, to the client computing device, information indicating a timestamp of the second frame, the bullet screen, and the target display position of the bullet screen in the second video frame.

18. The system of claim 17, the operations further comprising:

performing image recognition on the second frame and determining a position of the target object in the second frame; and determining the target display position of the bullet screen in the second frame based on the offset and the position of the target object in the second frame.

* * * * *